(12) United States Patent
Verschueren et al.

(10) Patent No.: US 7,714,947 B2
(45) Date of Patent: May 11, 2010

(54) LATERAL ION PUMPING IN LIQUID CRYSTAL DISPLAYS

(75) Inventors: Alwin Rogier Martijn Verschueren, Eindhoven (NL); Kristiaan Neyts, Ghent (BE); Goran Stojmenovik, Ghent (BE)

(73) Assignee: Chi Mei Optoelectronics Corporation, Tainan County (TW)

( * ) Notice: Subject to any disclaimer, the term of this patent is extended or adjusted under 35 U.S.C. 154(b) by 1108 days.

(21) Appl. No.: 10/569,592

(22) PCT Filed: Aug. 17, 2004

(86) PCT No.: PCT/IB2004/051469

§ 371 (c)(1),
(2), (4) Date: Feb. 23, 2006

(87) PCT Pub. No.: WO2005/022244

PCT Pub. Date: Mar. 10, 2005

(65) Prior Publication Data

US 2006/0256245 A1 Nov. 16, 2006

(30) Foreign Application Priority Data

Aug. 28, 2003 (EP) .................. 03103239

(51) Int. Cl.
*G02F 1/133* (2006.01)
(52) U.S. Cl. .......................................... 349/34; 349/33
(58) Field of Classification Search ............. 349/34, 349/33
See application file for complete search history.

(56) References Cited

U.S. PATENT DOCUMENTS

| | | | | |
|---|---|---|---|---|
| 3,843,231 A * | 10/1974 | Borel et al. | ................. | 349/202 |
| 4,759,609 A * | 7/1988 | Clerc | ........................... | 345/87 |
| 4,837,745 A * | 6/1989 | Eich et al. | .................... | 365/108 |
| 5,025,209 A * | 6/1991 | Takanashi et al. | ............. | 324/96 |
| 5,434,690 A * | 7/1995 | Hisatake et al. | ................. | 349/8 |
| 5,742,369 A * | 4/1998 | Mihara et al. | ................ | 349/123 |
| 6,177,968 B1 * | 1/2001 | Okada et al. | .................. | 349/38 |
| 6,493,049 B2 * | 12/2002 | Iwane | ........................... | 349/86 |
| 6,801,293 B1 * | 10/2004 | Nishiyama et al. | .......... | 349/187 |
| 6,803,976 B1 * | 10/2004 | Fujioka et al. | ................ | 349/54 |
| 2002/0060768 A1 * | 5/2002 | Chung et al. | ................. | 349/139 |
| 2005/0088604 A1 * | 4/2005 | Chung et al. | ................. | 349/153 |

(Continued)

FOREIGN PATENT DOCUMENTS

EP    1 055 960    11/2000

(Continued)

*Primary Examiner*—K. Cyrus Kianni
(74) *Attorney, Agent, or Firm*—Fish & Richardson P.C.

(57) ABSTRACT

The present invention relates to the removal of ion (42, 44, 902) contaminations from liquid crystal layers (901) in liquid crystal display devices (900). The ions (42, 44, 902) are removed by means of so called ion pumping, which utilizes the anisotropic viscosity of liquid crystals. The ions (42, 44, 902) are pumped up and down in the liquid crystal layer by means of an alternating electric filed. The alternating electric field simultaneously alters the alignment of directors (41) in the liquid crystal. The viscosity in the liquid crystal is related to the director directions, and the ions (42, 44, 902) are thereby moved in non-closed trajectories (43, 45). The inventive ion pumping can be further improved using an asymmetric or biased alternating electric field.

20 Claims, 7 Drawing Sheets

U.S. PATENT DOCUMENTS

2005/0195147 A1* 9/2005 Takahashi et al. ............. 345/94
2008/0185512 A1* 8/2008 Miller et al. ................ 250/287

FOREIGN PATENT DOCUMENTS

| JP | 3 5723 | 1/1991 |
| JP | 4 320211 | 11/1992 |
| JP | 5 19271 | 1/1993 |
| JP | 05 019271 | 6/1993 |
| JP | 5 323336 | 7/1993 |
| JP | 6 175142 | 6/1994 |
| JP | 10 177177 | 6/1998 |
| JP | 3005723 | 11/1999 |
| JP | 2001 66580 | 3/2001 |
| JP | 2001 201734 | 7/2001 |
| JP | 2002 196355 | 7/2002 |

* cited by examiner

LATERAL ION PUMPING IN LIQUID CRYSTAL DISPLAYS

The present invention relates to liquid crystal displays, and in particular to lateral transport and removal of ions residing in liquid crystal layers of such displays.

Ionic impurities are present in all types of liquid crystal displays. These impurities lead to image artefacts such as flicker, cross-talk and image retention and might also affect the lifetime of the display.

In STN-type (Super Twisted Nematic) liquid crystal displays the situation is particularly severe. The highest ion concentrations are in the order of $10^{20}$ $m^{-3}$, resulting in serious problems with cross-talk and image retention.

In LCoS (Liquid Crystal on Silicon) projection displays the initial ion concentration is much lower, typically in the order of $10^{17}$ $m^{-3}$. However, during the lifetime of such a display liquid crystal molecules are photo-chemically dissociated giving rise to an ion concentration increase by multiple orders of magnitude. Ultimately this high ion concentration (typically constituted by $F^-$ and $Cl^-$) will lead to a loss of alignment in the liquid crystal layer and end-of-life of the display.

Ion contaminations in the liquid crystal lead to image retention in other AMLCDs (Active Matrix Liquid Crystal Displays) as well. Image sticking problems in AMLCDs have been known for more than 15 years (see e.g. Y. Nanno et al., *Characterisation of the sticking effect of TFT-LCDs*, Proceedings of the SID, Vol. 31/4 (1990)), and still the problems have never been completely solved. One of the reasons for this is that a virtually undetectable ion concentration (below 1 ion per billion LC molecules) is enough to disturb the electric field in a liquid crystal cell. Despite state-of-art purified materials and clean-room conditioned cell processing, the ion concentrations inside the liquid crystal displays cannot be kept to a low enough level.

Known measures for limiting these problems primarily focus on preventing the in-diffusion of ions from the outside environment into the liquid crystal display area This is achieved using either a border ring electrode with DC fields (see for example US20020060768, EP1055960, JP2002196355, JP05323336), ion-capturing (adsorbing) materials at the border of the display area (see for example JP2000338505, JP04320211, JP03005723, JP2001201734, JP10177177), or a double wall surrounding the border of the display area (see for example JP06175142).

However, even though these measures indeed reduce the problems related to ion contamination of the liquid crystal the positive effect is still limited.

Border ring electrodes using DC fields will indeed attract incoming ions towards the electrodes. There, some of the ions will adsorb but others will diffuse parallel to the DC electric field. Application of a partly lateral electric DC field (as described in JP2002196355) will make it somewhat more difficult but still not impossible for ions to diffuse into the display area, and it requires relatively high driving voltages. A general drawback using this approach is that it only works for one polarity of ions. In fact, ions having opposite polarity are even forced into the display area. In addition, prolonged application of DC fields can degrade the liquid crystal material.

Ion-capturing materials only capture ions accidentally diffusing towards these materials, there is no mechanism directing the ions towards the ion-capturing materials.

Double walls surrounding the display area will ultimately also be permeable to ions. The idea behind this approach is to prevent ions from diffusing into the liquid crystal when it is filled into the display. Double walls indeed also have the effect of delaying ion diffusion during the lifetime of the display but ultimately ions nevertheless will diffuse into the display area.

Furthermore, as mentioned above undesired ion contamination is not only coming from the surrounding environment but also from the device itself due to diffusion from the alignment layer materials (inside the display area) and/or degradation of the liquid crystal material (by dissociation due to visible or UV light exposure or electric fields). Therefore, even if the ion protection at the borders as proposed in the mentioned prior-art would be totally impenetrable for ions, there would still appear ions in the liquid crystal.

JP2001066580 discloses a different approach, based on wall arrangements inside the display area serving to avoid lateral motion of the ions. It is described that ions move laterally due to potential differences across the LC layer leading to non-uniform ion distributions. The internal wall system described might indeed provide more uniform ion distributions, but does not affect the total ion contamination of the liquid crystal as a whole.

Thus, there is a need for an arrangement which effectively reduces the problems related to ion contamination in LCDs. Such an arrangement should not only shield the liquid crystal from ambient ions but also remove any ions appearing in the liquid crystal.

To this end an in situ purification technique is proposed. To achieve in situ purification, the ions need to be transported laterally to the boundaries of the display. One idea here could be to use lateral electric fields generated at the boundaries in order to transport the ions by migration. However, due to the large size of the display (for STN displays at least a few centimetres) thousands of volts are needed to achieve a lateral ion speed of 1 cm/hr. This approach is therefore not feasible.

Based on a new insight by the inventors, it is possible to achieve efficient lateral ion transport (of 1 cm/hr) using available electrodes and standard driving voltages (2.5 V is enough).

The underlying principle of the inventive ion transport is that a transverse electric field (i.e. between electrodes on top and bottom glass plates) leads to a lateral motion of the ions (i.e. directed towards the boundaries of the display) in anisotropic liquid crystal material. This is due to anisotropy in viscosity, resulting in that the ions move more easily (with higher mobility) along the liquid crystal directors than perpendicular to them. Any periodic director fluctuation will lead to non-closed ion trajectories. This implies for example that when a DC component is present in the driving, the director angles will be different when the ion moves upwards and downwards. This will make the corresponding ion speeds in right-wards and left-wards direction different, resulting in a net lateral ion displacement. The effect is therefore called ion pumping.

Thus, according to one aspect of the invention a liquid crystal display device comprising a liquid crystal layer is proposed. The liquid crystal layer has an anisotropic viscosity which depends on alignment of directors in the layer. The liquid crystal display device further comprises an ion removing driving unit (which, for example, might be a pixel driving unit) in order to provide for the removal of ions from the liquid crystal layer. To this end the ion removing driving unit is operative to apply a uniform alternating voltage across said electrodes resulting in a uniform alternating electric field across said liquid crystal layer. Thereby the directors are aligned along gradually alternating director directions and the ions are moved along gradually alternating ion directions that depend on said electric field and on said director directions.

As a consequence, ions are gradually moved laterally within the layer towards the boundaries thereof and thereby removed from the liquid crystal layer.

Of course, the wording uniform electrical field refers to lateral directions and not necessarily to transversal directions in the liquid crystal layer. A LCD typically comprises a plurality of pixels having separate electrodes. For the purpose of the present invention, a uniform alternating voltage is a voltage applied to a number of pixels corresponding to the area wherefrom ions are to be removed. In case ions are to be removed from the entire display, the uniform voltage is thus applied to every pixel. Thereby a (laterally) uniform electric field is created in the liquid crystal layer having a lateral extension including a number of pixels. Of course, small voltage and field variations might be present between different pixels, the important issue being that lateral movement of ions across different pixels is facilitated.

Preferably, the alternating voltage is a square alternating voltage. The liquid crystal reorientation is polarity independent, and square waves thus have the same effect on the directors as a pure DC signal. However, the ion movement is polarity dependent. And therefore, to avoid the build-up of ions on any of the substrates and to avoid electro-chemical effects, alternating driving voltages of square wave shape are preferably used. The wording square alternating voltage is only intended to distinguish the voltage from sinusoidal voltages and of course also includes voltages being close to square and superposed square waves such as Alt & Pleshko waves. Thus, several driving waveforms are possible. In active matrix driving, essentially symmetric square waves are often preferred while in passive matrix driving (e.g. STN) Alt & Pleshko waves (or derived from this) are the preferred choice. In comparison, a sinus-shape voltage would indeed avoid the build-up of ions (and electro-chemistry), but would result in a flickering image.

The inventive lateral ion transport is most effective for voltages alternating in the frequency range bounded by the ion-transit frequency and liquid crystal switching frequency. The ion transit frequency ($f_t$) is defined as the maximum frequency that allows ions to traverse the complete cell gap d (i.e. the thickness of the liquid crystal layer) in alternating half-periods, and it can be approximated by $\mu V/d^2$, determined by the average mobility $\mu$ of the ions. The liquid crystal switching frequency ($f_s$) is defined as the maximum frequency at which the liquid crystal director reorientation can follow the variations in the applied driving voltages. This $f_s$ can be approximated by $\Delta \in V^2 / \gamma d^2$, determined by the dielectric anisotropy $\Delta \in$ and rotational viscosity $\gamma$ of the liquid crystal material. Preferably the frequency of polarity alternation should be within the range bounded by the ion transit frequency ($f_t$) and the liquid crystal switching frequency ($f_s$). For practical purposes this means that the driving voltage frequency preferably should be within the range of 1-10 Hz. The ion removing alternating electric field can be provided using conventional pixel electrodes, and the alternating driving voltage can be supplied by a conventional pixel driving unit after straightforward modifications facilitating the application of a uniform, alternating voltage to the pixels.

According to one embodiment, the alternating voltage is a biased alternating voltage, and the alternating electric field is consequently a biased alternating electric field. The application of a biased voltage results in the director relocation being different for different polarities, since the relocation depends on the absolute value of the applied electric field. In order to achieve net lateral transport for low ion concentrations it is actually necessary to introduce some bias or asymmetry in the driving voltage. The bias can either be in a DC component applied to the alternating voltage or in a duty factor in the alternating voltage. What matters is that there is an asymmetry at the relevant timescale (determined by the ion transit and liquid crystal switching frequencies) such that the ion trajectories are not closed. This means that at longer timescales (for instance after several periods) the DC component can indeed be alternated.

According to one embodiment, the display device further comprises means for heating the liquid crystal layer. This is advantageous since heating the liquid crystal is found to improve lateral movement of the ions and thus accelerates the removal of them from the liquid crystal.

According to one embodiment, the liquid crystal layer is encapsulated between two rubbing layers, each rubbing layer having a rubbing direction adapted so as to provide a desired lateral direction for the ions. By choosing suitable rubbing directions, one can influence the direction of the lateral ion transport. In general, the ion motion will be in the direction perpendicular to the mid-plane (half cell-gap) director. Changing to opposite handedness of the twist will direct the ion motion in the exactly opposite direction. This embodiment is thus advantageous in that the ions can be directed towards any desired direction, for example towards an ion absorbing material arranged along one side of the liquid crystal layer.

According to one embodiment, the display device has an addressable display area and further comprises means for retaining ions outside said addressable display area.

The ion retaining means can for example be provided as border ring electrodes surrounding at least a portion of said addressable display area. In such case, the ion removing driving unit is operative to apply a biased alternating electric voltage across the border ring electrodes such that ions are detained between the border ring electrodes outside the addressable display area. As an alternative to border ring electrodes, the display device can be provided with an ion capturing material outside said addressable display area. This is advantageous in that the ions are effectively trapped outside and thus stopped from re-entering the addressable display area.

According to another aspect of the invention, a method of removing ions from a layer of liquid crystal in a liquid crystal display device is provided. For the successful operation of the inventive method, the liquid crystal layer must have an anisotropic viscosity that depends on the alignment of directors in the liquid crystal. The inventive method comprises the step of:

applying a biased alternating electric field transversally across the liquid crystal layer; having the simultaneous effect of aligning the directors along alternating director directions; and moving the ions along alternating ion directions which depend on said electric field as well as on said director directions. Thereby ions are gradually moved laterally within the layer. The inventive method thus provides an advantageous approach for removing ions from the liquid crystal layer of liquid crystal displays.

According to one embodiment, the alternating electric field is a biased alternating electric field. The advantages using a biased electric field are described above.

According to one embodiment, the method is performed in a screen saver mode. The screen saver mode is advantageously activated between periods of normal operation of the display, for example when the display is in a stand-by mode. The re-diffusion process is typically about 100 times slower than the ion pumping process. Therefore, even during heavy use the display only needs to be in the screen saver mode for a small fraction of the time. For example, repeatedly running a display in normal operation for 59 minutes and thereafter running it in the screen saver mode for only one minute compensates for any ions appearing in the liquid crystal and thus keeps the total number of ions at a fully acceptable level.

According to one embodiment, the method is performed during manufacturing of the liquid crystal display device. Thereby the requirements regarding ion impurity can be relaxed substantially compared to conventional manufacturing processes which does not provide for any active removal of ions from the liquid crystal layer. Performing the method only during manufacturing has an additional advantage in that separate electrodes and driving means can apply the alternating electric field. Thereby conventional display designs can be manufactured taking advantage of the inventive method. If the method is to be performed during manufacturing, UV polymerisable walls surrounding and encapsulating the addressable part of the liquid crystal layer might be provided and polymerised by means of UV illumination subsequent to the removal of ions, and thus trapping the ions outside the relevant part of the liquid crystal layer.

According to one embodiment, the method further comprises the step of heating the liquid crystal layer whereby the lateral movement of the ions is improved. Heating the liquid crystal is very effective: the lateral movement is typically increased by factor of about 2 for every 10 degrees temperature raise.

According to one embodiment, the biased alternating electric field comprises a direct voltage component which successively changes polarity. Thereby issues related to prolonged application of a direct field across the liquid crystal layer are eliminated. Positive and negative components can be alternated for instance on a timescale of minutes (e.g. positive for 2 minutes and negative for 2 minutes).

Conventional, overlapping electrodes can thus be used to generate purely transversal electric fields, which have the same net directional effect in the lateral dimension on both polarities of ions. DC components on top of AC square-waves are used in the driving, instead of a conventional AC driving voltage. The polarity of the DC components used can even be alternated without influencing the directionality of the ion pumping. The net forces on the ions are perpendicular to the applied electric fields, and the ions are thus moved in a lateral direction as a result of the pumping.

Using the inventive arrangement, it is even possible to ease the processing requirements during manufacturing and to allow a higher post-processing ion contamination since excess ions will eventually be pumped away from the display area. This effect will substantially increase the yield from the manufacturing process.

It is interesting to note that in accordance with the general notion, and as disclosed in e.g. JP2001066580, lateral motion of ions inside liquid crystal is explained by differences in average potential creating lateral electric fields. The present invention is instead based on the discovery that liquid crystal provides for ion mobility anisotropy. In effect, ions will tend to move in a certain direction in the liquid crystal.

The invention will now be described in further detail, with reference to the accompanying exemplifying drawings, on which:

Figure 1:
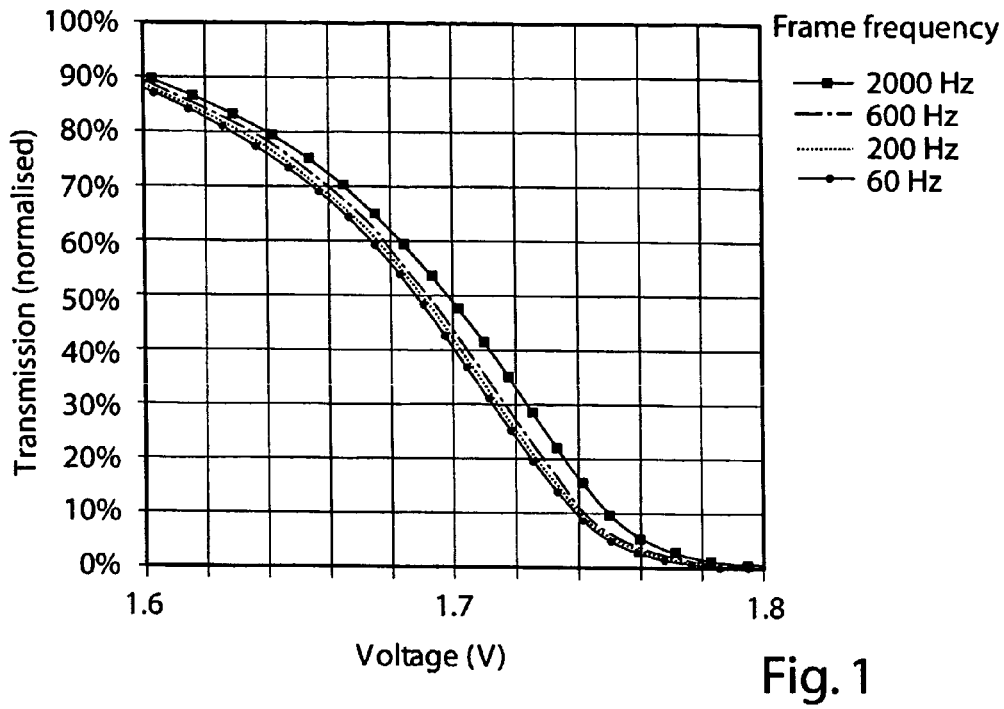
FIGS. 1 and 2 are graphs showing Transmission-Voltage curves for different driving frequencies, for a good cell and a bad cell.
Figure 2:
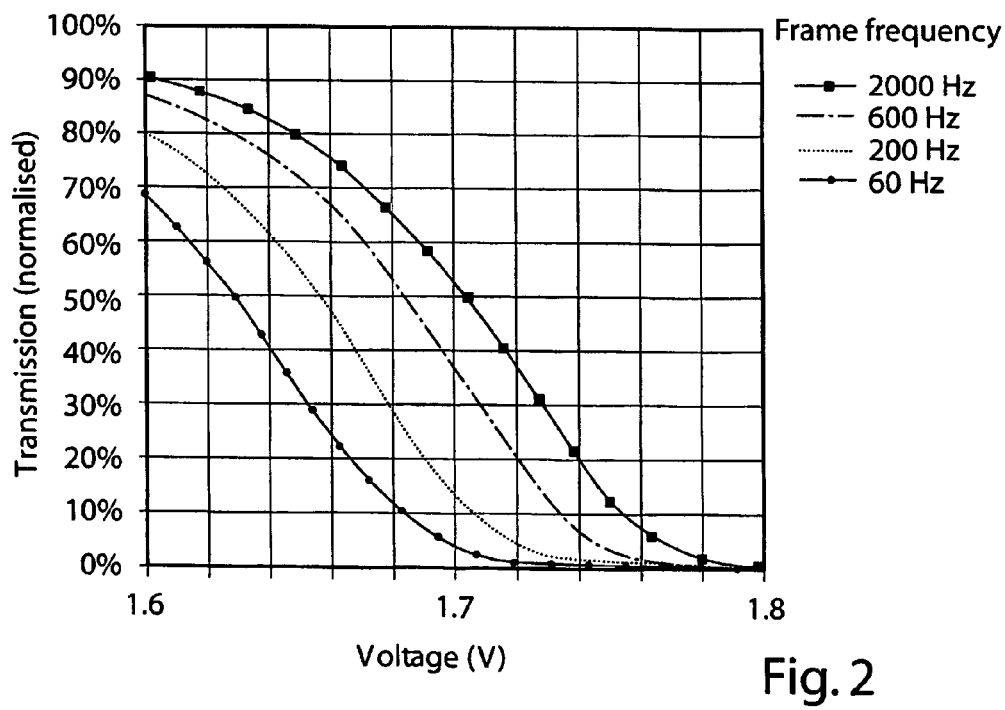

To illustrate the problem with ion contamination, the specific case for STN liquid crystal displays is illustrated in FIGS. 1 and 2. FIG. 1 is a graph showing the limited frequency dependence of the transmission in a STN LCD having a low level of ion contamination (5E19 ions per $m^{-3}$). In comparison, FIG. 2 is a corresponding graph showing the substantial frequency dependence of the transmission in an ion contaminated (5E20 ions per $m^{-3}$). STN LCD. From FIGS. 1 and 2, it can thus be observed that a too high ion concentration gives rise to a frequency dependence of the transmission-voltage curve. A frequency dependent transmission-voltage curve in turn leads to visible cross talk and image retention artefacts.

Figure 3:
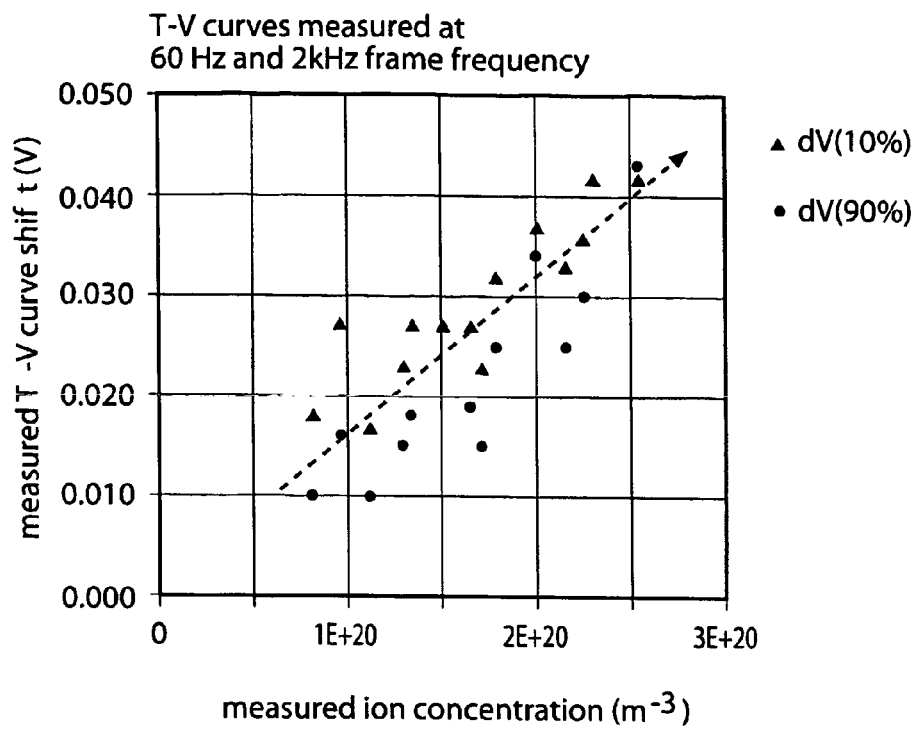
FIG. 3 is a graph showing an experimental correlation between ion concentration and the frequency dependence of the T-V curve.

In FIG. 3, recent experimental data is plotted on the relation between the ion concentration and the frequency-dependence. This curve is derived from measurements as those shown in FIG. 1 and FIG. 2. At given transmission levels dV(10%) and dV(90%), the corresponding shift in the voltage between 60 Hz and 2000 Hz is found. After collecting these shifts for different samples with different ion concentrations, the correlation of FIG. 3 has been established. From these results it can be concluded that the ion concentration should be lower than about $5 \cdot 10^{19}$ $m^{-3}$ in order to avoid visible cross-talk artefacts in a typical STN display. Conventional manufacturing processes are not capable of achieving this even if clean processing conditions and purified liquid crystal materials are used.

Figure 4:
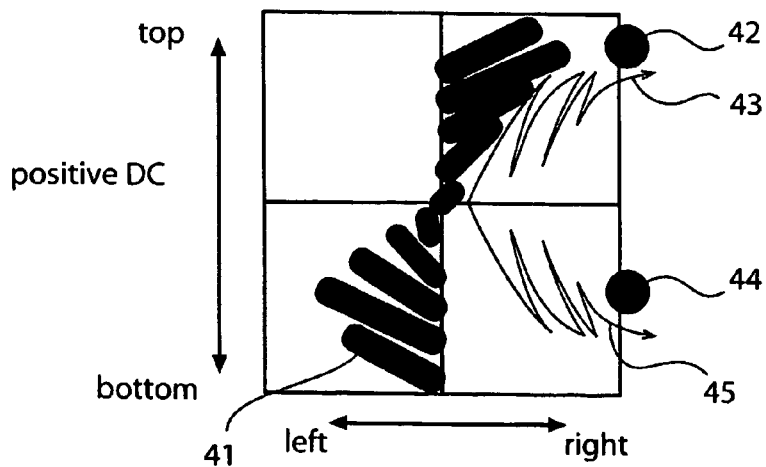
FIG. 4 illustrates a cross-section of a typical STN director profile.

As an example, in FIG. 4, a typical cross-section of the director profile is plotted for an STN display showing the twisted directors 41, a positive ion 42, and a negative ion 44. By driving with a square wave voltage (with alternating polarity), the positive ions will not only be swept up and down, but also to the right and left, given the director angles of FIG. 4. On the whole, the positive ion will travel along the zigzag path indicated by arrow 43, and the negative ion 44 will travel along path 45.

Figure 5:
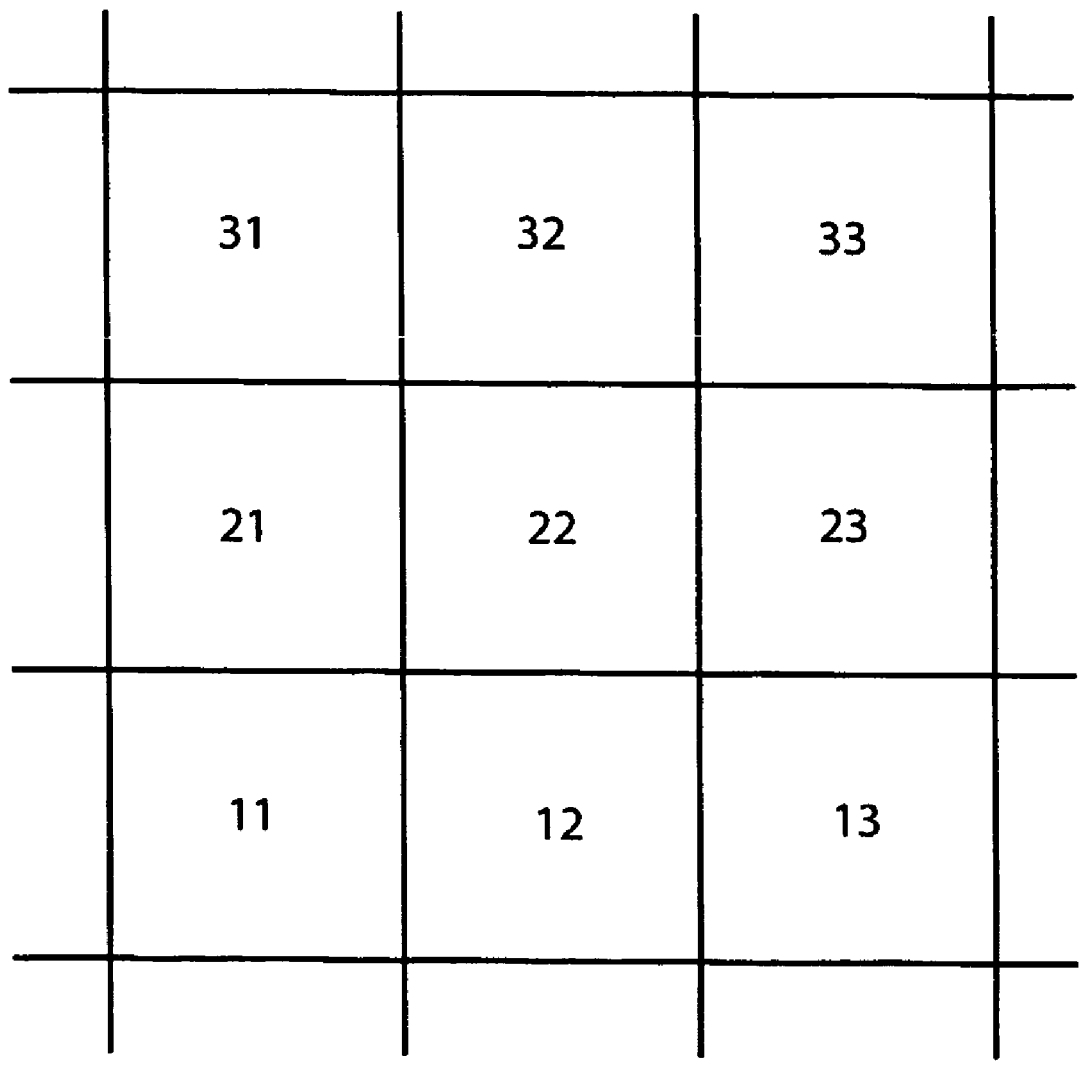
FIG. 5 illustrates a display having nine enumerated pixels.
Figure 6:
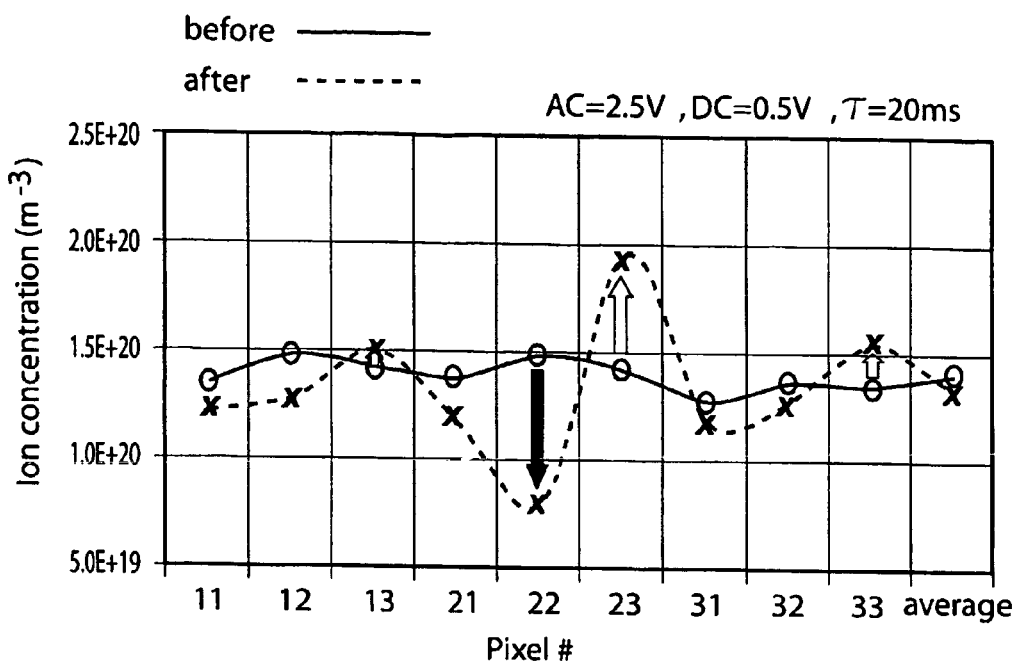
FIG. 6 is a graph showing ion concentrations in the pixel illustrated in FIG. 5.

To prove that this effect really occurs in STN cells, several experiments have been performed on a nine-pixel display unit is schematically illustrated in FIG. 5. The display unit thus has pixels 11, 12, 13, 21, 22, 23, 31, 32, and 33. First of all, pumping was applied to pixel 22 only (2.5 V AC, 0.5 V DC, and 20 ms frametime). The results are shown in FIG. 6, where it is obvious that a significant amount of ions are relocated from pixel 22 to the neighbouring pixels on the right (mainly to 23, but also slightly to 13 and 33).

This first experiment proves that ions can be laterally relocated by means of ion pumping. The average concentration of ions over all pixels has stayed constant. Ions have not recombined or adsorbed on the electrodes, but only moved laterally.

Figure 7:
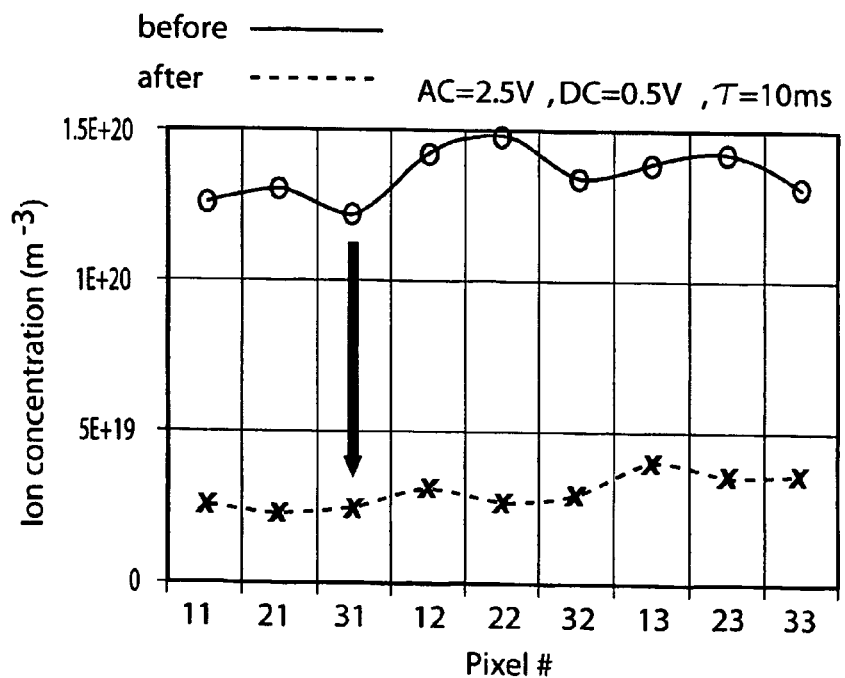
FIG. 7 is a graph similar to FIG. 6 but for the case when ion pumping is employed for all nine pixels simultaneously.

To prove the effectiveness of the ion pumping, pumping was performed (2.5 V AC, 0.5 V DC, and 10 ms frametime) on all pixels and the results are shown in FIG. 7. As can be seen, the ion concentration in the addressable area of the complete display is reduced by a factor of 5 within a few hours. Clearly this STN display that was initially not within specification (and consequently showed cross-talk), is well below the critical ion concentration after the ion pumping.

Figure 8:
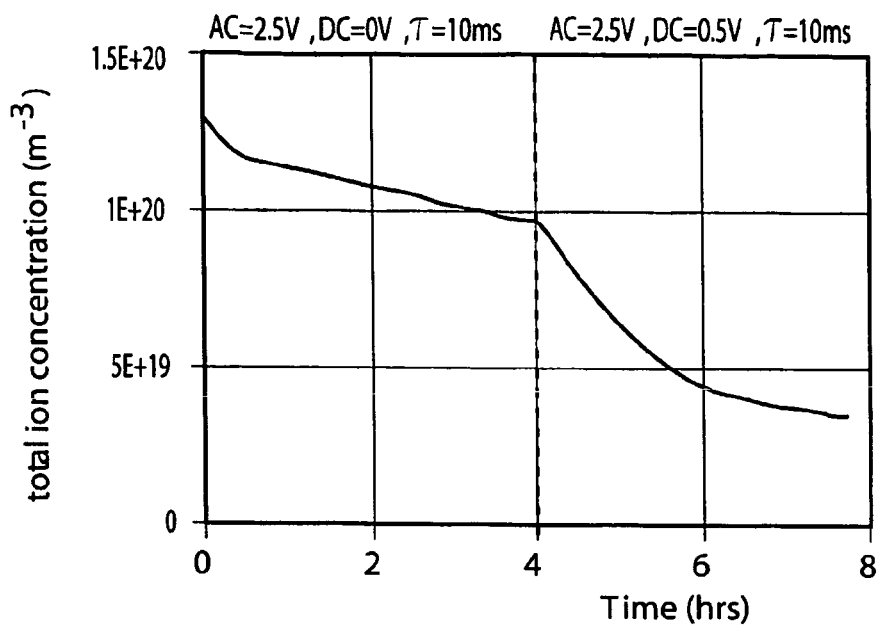
FIGS. 8 and 9 show ion concentrations in the addressable area, while pumping (on the left) and during re-diffusion (on the right).

In FIG. 7 the ions have been pumped towards the boundaries of the addressable area. The speed of the ion pumping is depicted in FIG. 8. The alternating voltage was set to 2.5 V and the frametime was set to 10 ms. The first 4 hours no DC component was applied and the following four hours a 0.5 V DC was applied. From FIG. 7 it is obvious that the pumping indeed proceeds faster when a DC component is applied. It should be remarked here that for the specific director orientation of FIG. 4 it does not matter whether a positive or a negative DC component is applied. For both DC polarities all ions will move rightwards. On average a lateral ion velocity of 1 cm/hr can be obtained.

Figure 9:
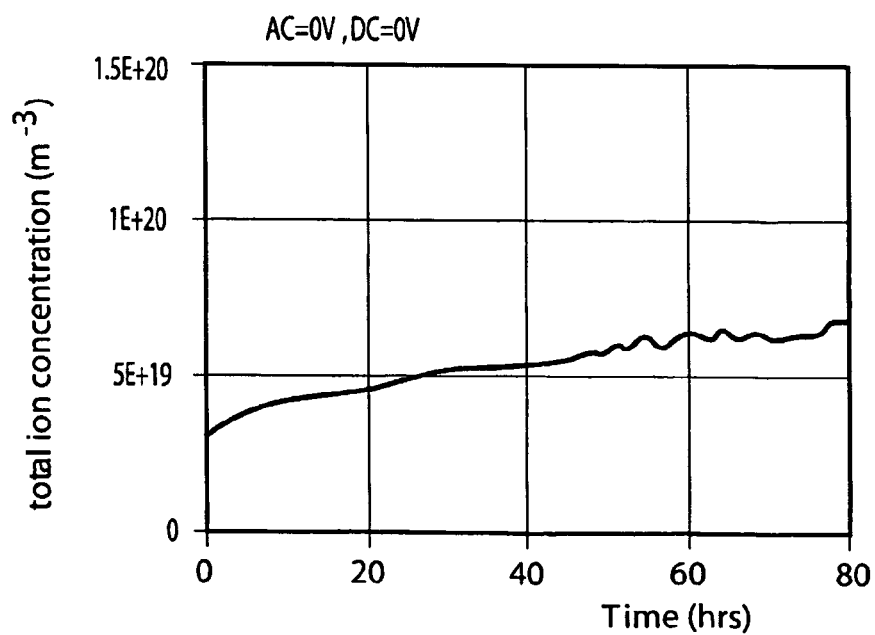

In comparison, the speed of the re-diffusion process is plotted in FIG. 9. Since re-diffusion is caused by ions diffusion, this will take place very slowly (around 1 cm/wk). Re-diffusion thus proceeds about 100 times slower than the pumping, and the inventive ion pumping is therefore not that time critical.

To make the lateral ion pumping even more useful, several embodiments are envisaged in order to keep the ions outside the boundaries of the addressable area.

According to one embodiment the ion pumping driving mode is used as a screen saver. For example, in mobile phones this will work also for the most demanding user because even if the screen-saver is on for only 1 minute per hour the worst case ion diffusion during the 59 minutes is easily offset by 1 minute of ion pumping (see FIGS. 8 and 9).

Figure 10:
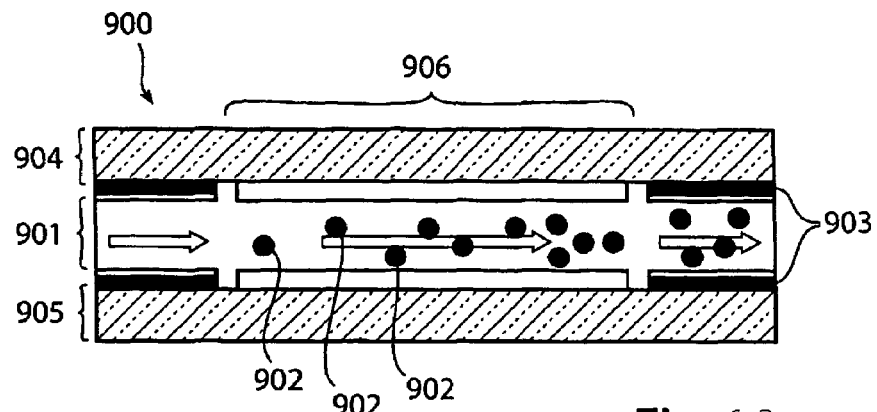
FIG. 10 shows a cross section of an inventive display wherein the ions are kept outside the addressable area by active pumping with a border ring electrode.

Another embodiment is illustrated in FIG. 10. FIG. 10 thus illustrates a cross section of an inventive display unit 900. The display unit 900 comprises a liquid crystal layer 901 contaminated by ions 902 and sandwiched between two substrates 904, 905. Electrodes 903 are arranged on opposite sides of the liquid crystal layer and outside an addressable area 906 of the display unit. According to this embodiment, the border ring electrode is used to continuously pump the ions in order to keep them outside the addressable area 906.

Figure 11:
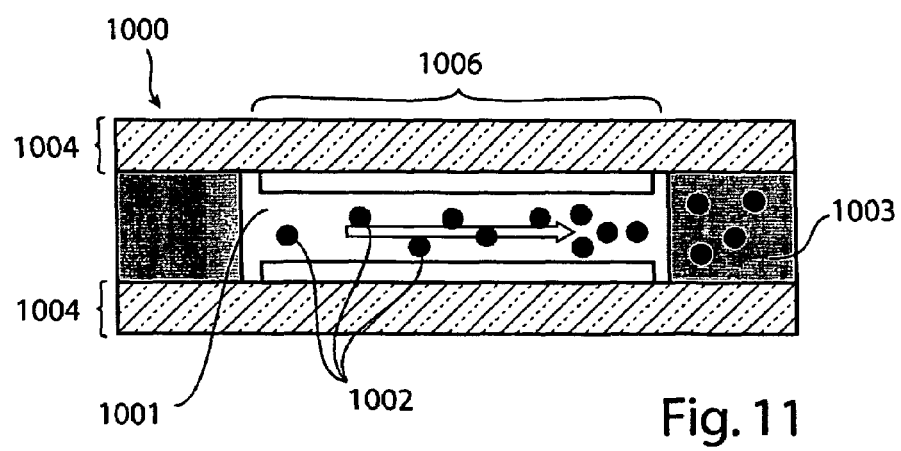
FIG. 11 shows a cross-section of an inventive display wherein the ions are kept outside the addressable area by means of ion capturing material.

As an alternative to border ring electrodes, FIG. 11 illustrates an embodiment instead using ion-capturing material outside the addressable area. FIG. 11 thus illustrates a cross section of a LCD unit 1000 comprising a liquid crystal layer 1001 contaminated by ions 1002. The liquid crystal is sandwiched between substrates 1004, 1005 and sealed off by ion capturing material 1003. Ions pumped from the addressable area 1006 are thus captured in the ion capturing material 1003.

Figure 12:
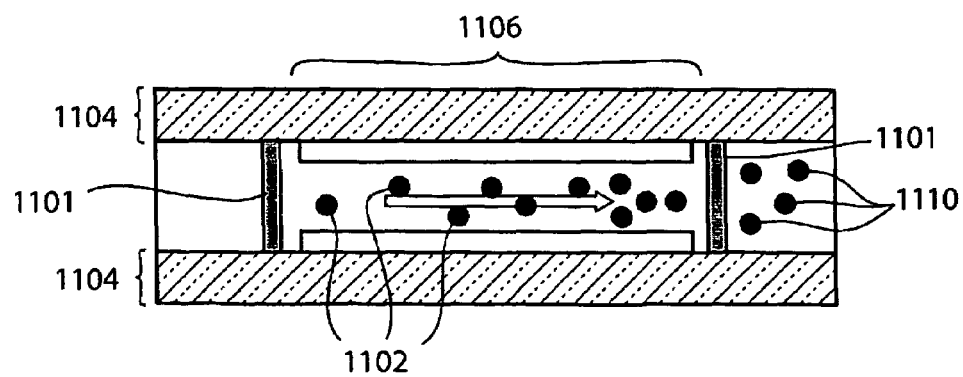
FIG. 12 shows a cross-section of an inventive display wherein the ions are kept outside the addressable area by means of polymerisable walls during the production process.

An inventive method of manufacturing LCDs is also envisaged, and illustrated in FIG. 12. FIG. 12 thus illustrates a cross section corresponding to the those shown in FIGS. 10 and 11, but instead having UV polymerisable walls 1101 at the boundaries of the addressable area After filling the cell with liquid crystal, the electrodes are driven for a certain time in order to pump the ions outside the addressable area. Then by UV illumination the polymerisation of the walls can take place, after which the ions will remain trapped outside the addressable area. Other polymerisable materials than UV polymerisable materials are of course envisaged as well.

It is also possible to heat the liquid crystal while the ion pumping is performed. As it turns out, the pumping speed is increased with a factor of about 2 for every 10° C. temperature rise. This can be implemented by applying current to additional ITO (Indium Tin Oxide) tracks either inside or outside the panel.

As described above, the pumping effect is pronounced substantially using a biased alternating pumping voltage. In order to reduce problems related to prolonged application of DC voltages through the liquid crystal layer, the DC is preferably applied with alternating polarities. This can for example be done on the timescale of minutes, and does not affect the pumping since the pumping is polarity independent.

Figure 13:
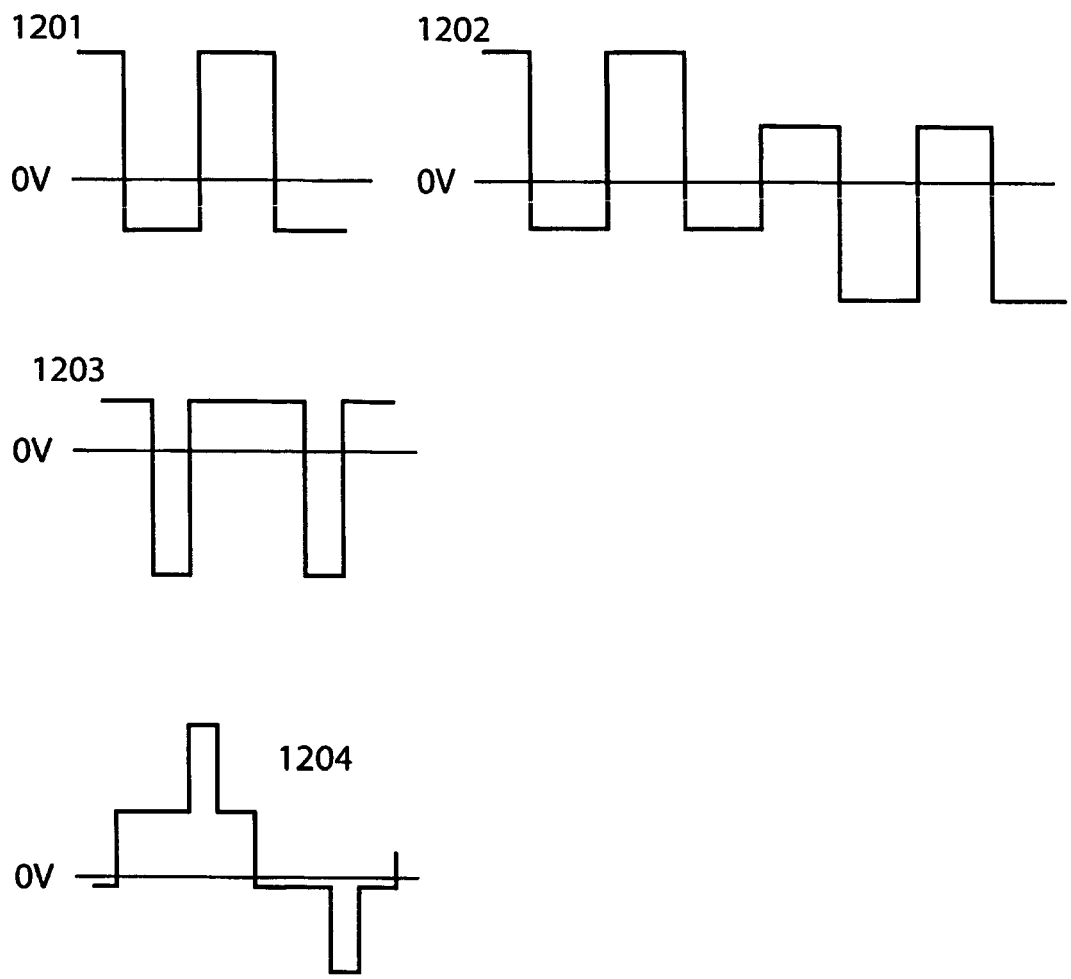
FIG. 13 illustrates various driving voltages suitable for inventive ion pumping.

The lateral direction of the ion displacement during pumping can be controlled by the rubbing directions and the handedness of the twist. With these parameters the direction of the pumping can be controlled (within the full 360° range). Depending on these parameters, all ions can be moved to the right, or to the left. Alternatively all positive ions can be moved in one direction, and the negative moved in an opposite direction. The latter is achieved for twist angles smaller than 180 degrees. In general, the ion motion will be in the direction perpendicular to the mid-plane (half cellgap) director. Changing to opposite handedness of the twist will direct the ion motion in exactly opposite direction. In FIG. 13 various driving voltages are illustrated. 1201 illustrates a biased or asymmetric voltage comprising a square AC voltage and a continuous DC voltage. 1202 illustrates a similar voltage, but where the DC voltage changes polarity over time. The DC however changes polarity on a much larger timescale (e.g. once every minute) than does the square AC voltage (e.g. ten times every second). 1203 illustrates an asymmetric square wave without a DC component. Instead the positive portions of the square AC component is substantially longer than the negative portions. Finally, 1204 illustrates a Alt & Pleshko wave component having a superimposed DC component.

In essence, the present invention relates to the removal of ion 42, 44 contaminations from liquid crystal layers in liquid crystal display devices. The ions are removed by means of so called ion pumping, which utilizes the anisotropic viscosity of liquid crystals. The ions are pumped up and down in the liquid crystal layer by means of an alternating electric filed. The alternating electric field simultaneously alters the alignment of directors 41 in the liquid crystal. The viscosity in the liquid crystal is related to the director directions, and the ions are thereby moved in non-closed trajectories 43, 45. The inventive ion pumping can be further improved using an asymmetric or biased alternating electric field.

The invention claimed is:

1. A liquid crystal display device comprising:
    a liquid crystal layer having an anisotropic viscosity which depends on alignment of directors in the liquid crystal layer;
    means for applying a uniform alternating electric field across said liquid crystal layer, in which the alternating electric field is configured to align said directors along alternating director directions and drive ions along alternating ion directions which depend on said electric field and on said director directions to gradually drive the ions laterally within the liquid crystal layer; and
    means for retaining ions outside an addressable display area, the means for retaining ions comprising UV polymerisable walls disposed at boundaries of an addressable area of the liquid crystal layer.

2. A liquid crystal display device according to claim 1, wherein said alternating electric field is a biased alternating electric field.

3. A liquid crystal display device according to claim 1, said device further comprising means for heating the liquid crystal layer and thus improving lateral movement of the ions.

4. A liquid crystal display device according to claim 1, wherein said means for applying a uniform alternating electric field comprises pixel electrodes, arranged on opposite sides of the liquid crystal layer, and a pixel driving unit operative to drive the pixels.

5. The liquid crystal display device of claim 1 in which the means for retaining ions comprises an ion capturing material.

6. The liquid crystal display device of claim 1, further comprising two rubbing layers, in which the liquid crystal layer is disposed between the two rubbing layers, and each of the rubbing layers has a rubbing direction configured to cause the ions to move toward one or more predetermined directions.

7. The liquid crystal display device of claim 6 in which the rubbing directions of the rubbing layers are configured to cause positive and negative ions to move toward a same side of the display.

8. The liquid crystal display device of claim 1 in which the alternating electric field has a frequency in a range between an ion-transit frequency and a liquid crystal switching frequency.

9. The liquid crystal display device of claim 8 in which the ion-transit frequency is defined as the maximum frequency that allows ions to traverse a complete cell gap of the liquid crystal layer in alternating half-periods, and the liquid crystal switching frequency is defined as the maximum frequency at which liquid crystal director reorientation can follow variations in the alternating electric field.

10. The liquid crystal display device of claim 1 in which the alternating electric field has a frequency in a range from 1 to 10 Hz.

11. A liquid crystal display device comprising:
a liquid crystal layer having an anisotropic viscosity which depends on alignment of directors in the liquid crystal layer;
means for applying a uniform alternating electric field across said liquid crystal layer, in which the alternating electric field is configured to align said directors along alternating director directions and drive ions along alternating ion directions which depend on said electric field and on said director directions to gradually drive the ions laterally within the liquid crystal layer; and
two rubbing layers, in which the liquid crystal layer is disposed between the two rubbing layers, each of the rubbing layers has a rubbing direction configured to cause the ions to move toward one or more predetermined directions, the rubbing directions of the rubbing layers being configured to cause positive ions to move toward a first side of the display and negative ions to move toward a second side of the display.

12. A liquid crystal display device according to claim 11, said display device further comprising means for retaining ions outside an addressable display area.

13. The liquid crystal display device of claim 12 in which the means for retaining ions comprises UV polymerisable walls disposed at boundaries of an addressable area of the liquid crystal layer.

14. The liquid crystal display device of claim 12 in which the means for retaining ions comprises an ion capturing material.

15. A liquid crystal display device according to claim 11, wherein said alternating electric field is a biased alternating electric field.

16. A liquid crystal display device according to claim 11, said device further comprising means for heating the liquid crystal layer and thus improving lateral movement of the ions.

17. A liquid crystal display device according to claim 11, wherein said means for applying a uniform alternating electric field comprises pixel electrodes, arranged on opposite sides of the liquid crystal layer, and a pixel driving unit operative to drive the pixels.

18. The liquid crystal display device of claim 11 in which the rubbing directions of the rubbing layers are configured to cause positive and negative ions to move toward a same side of the display.

19. The liquid crystal display device of claim 11 in which the alternating electric field has a frequency in a range between an ion-transit frequency and a liquid crystal switching frequency.

20. The liquid crystal display device of claim 19 in which the ion-transit frequency is defined as the maximum frequency that allows ions to traverse a complete cell gap of the liquid crystal layer in alternating half-periods, and the liquid crystal switching frequency is defined as the maximum frequency at which liquid crystal director reorientation can follow variations in the alternating electric field.

* * * * *